United States Patent
Casperson

(10) Patent No.: US 9,108,286 B2
(45) Date of Patent: Aug. 18, 2015

(54) CLAMPING DEVICE FOR A TOOL OR A WORKPIECE

(75) Inventor: Hans-Owe Casperson, Gustavsberg (SE)

(73) Assignee: System 3R International AB, Stockholm (SE)

( * ) Notice: Subject to any disclaimer, the term of this patent is extended or adjusted under 35 U.S.C. 154(b) by 1012 days.

(21) Appl. No.: 11/995,108

(22) PCT Filed: May 13, 2006

(86) PCT No.: PCT/EP2006/004512
§ 371 (c)(1),
(2), (4) Date: Jan. 9, 2008

(87) PCT Pub. No.: WO2007/006360
PCT Pub. Date: Jan. 18, 2007

(65) Prior Publication Data
US 2008/0197584 A1 Aug. 21, 2008

(30) Foreign Application Priority Data
Jul. 9, 2005 (EP) ..................... 05014919

(51) Int. Cl.
| B23B 31/22 | (2006.01) |
| B23B 31/113 | (2006.01) |
| B23Q 16/08 | (2006.01) |
| B23Q 1/00 | (2006.01) |
| B23B 31/107 | (2006.01) |
| B23B 23/00 | (2006.01) |
| B25D 17/08 | (2006.01) |

(52) U.S. Cl.
CPC .............. *B23Q 16/08* (2013.01); *B23B 31/113* (2013.01); *B23B 31/22* (2013.01); *B23Q 1/0072* (2013.01); *Y10T 279/17008* (2015.01); *Y10T 279/17196* (2015.01); *Y10T 279/17752* (2015.01); *Y10T 279/17888* (2015.01); *Y10T 279/1986* (2015.01)

(58) Field of Classification Search
CPC .... B23Q 16/08; B23Q 1/0072; B23B 1/1071; B23B 23/0035; B23B 31/005; B23B 29/20; B25D 17/088; B21D 25/04; Y10T 279/1241; Y10T 279/17008; Y10T 279/17145; Y10T 279/17196; Y10T 279/17752; Y10T 279/3406; Y10T 279/17888
USPC ............ 279/75, 93, 143, 14, 22, 30, 905, 906
IPC ........................... B32B 31/22, 31/113
See application file for complete search history.

(56) References Cited

U.S. PATENT DOCUMENTS 2,985,457 A * 5/1961 Sima ............................... 279/93
3,843,143 A * 10/1974 Laxson ......................... 279/144
(Continued)

FOREIGN PATENT DOCUMENTS

DE 37 13 023 10/1988

OTHER PUBLICATIONS

Merriam-Webster online dictionary; Dec. 8, 2011; http://www.merriam-webster.com/dictionary/hollow.*

*Primary Examiner* — Eric A Gates
*Assistant Examiner* — Bayan Salone
(74) *Attorney, Agent, or Firm* — Bachman & LaPointe, PC

(57) ABSTRACT

A clamping device for a tool or a workpiece, comprising at least one chuck and at least one holder for the workpiece or the tool. The holder is provided with a tubular extension.

28 Claims, 13 Drawing Sheets

(56) References Cited

U.S. PATENT DOCUMENTS

| | | | |
|---|---|---|---|
| 4,652,203 A | 3/1987 | Nakashima et al. | |
| 5,160,150 A * | 11/1992 | Schmidt | 279/58 |
| 5,190,272 A | 3/1993 | Zika et al. | |
| 5,261,758 A * | 11/1993 | Vranish | 403/348 |
| 5,285,510 A * | 2/1994 | Slaney | 385/78 |
| 5,415,384 A * | 5/1995 | Obrist et al. | 269/309 |
| 5,820,136 A * | 10/1998 | Han et al. | 279/131 |
| 5,921,563 A * | 7/1999 | Huggins et al. | 279/131 |
| 5,961,261 A * | 10/1999 | Stark | 409/219 |
| 6,073,325 A * | 6/2000 | Stark | 29/33 P |
| 6,089,557 A * | 7/2000 | Obrist | 269/309 |
| 6,139,002 A * | 10/2000 | Stark | 269/309 |
| 6,161,826 A * | 12/2000 | Forrer | 269/309 |
| 6,179,303 B1 * | 1/2001 | Jansen | 279/91 |
| 6,273,434 B1 * | 8/2001 | Stark | 279/4.06 |
| 6,283,465 B1 * | 9/2001 | Etter | 269/309 |
| 6,367,814 B1 * | 4/2002 | Luscher et al. | 279/2.09 |
| 6,375,378 B1 * | 4/2002 | Kitaura | 403/31 |
| 6,533,291 B2 * | 3/2003 | Huggins et al. | 279/29 |
| 6,551,037 B2 * | 4/2003 | Gifford et al. | 408/239 R |
| 6,641,127 B2 * | 11/2003 | Haruna | 269/309 |
| 6,641,128 B2 * | 11/2003 | Fries | 269/309 |
| 6,719,303 B2 * | 4/2004 | Stephens | 279/4.12 |
| 6,799,758 B2 * | 10/2004 | Fries | 269/309 |
| 6,834,864 B2 * | 12/2004 | Girardeau | 279/60 |
| 6,860,477 B2 * | 3/2005 | Etter | 269/309 |
| 7,331,738 B2 * | 2/2008 | Hofbrucker et al. | 408/239 A |
| 7,425,000 B2 * | 9/2008 | Stark | 269/309 |
| 7,584,971 B2 * | 9/2009 | Weller | 279/93 |
| 8,061,717 B2 * | 11/2011 | Roth | 279/2.12 |
| 8,066,289 B2 * | 11/2011 | Gross et al. | 279/4.12 |
| 2001/0022420 A1 * | 9/2001 | Etter | 269/309 |
| 2003/0111786 A1 * | 6/2003 | Fries | 269/309 |
| 2004/0113346 A1 * | 6/2004 | Kawakami et al. | 269/309 |

* cited by examiner

CLAMPING DEVICE FOR A TOOL OR A WORKPIECE

BACKGROUND OF THE INVENTION

The invention relates to a clamping device for a tool or a workpiece, comprising at least one chuck and at least one holder for the workpiece or the tool.

Clamping devices of this generic type are used to clamp workpieces or tools, very high precision being demanded in the machining of the workpiece. In addition, an exactly reproducible clamping of the workpiece or the tool in the x, y and z directions must be ensured.

From EP-A-255 042, a clamping device is described wherein, for the accurate positioning of the two coupling members (chuck and holder) relative to one another in the z direction, which usually coincides with the clamping direction, a plurality of uprights are present on one of the clamping members and the z reference surfaces are configured on the free end faces of said uprights. On the other coupling member there are, in an arrangement corresponding to the uprights, a plurality of z counter reference surfaces, which lie in a common plane and, when the coupling members are clamped together, cooperate with the z reference surfaces. A similar arrangement for the z positioning of two coupling members is known from German registered utility model DE-U-295 21 030.

Another clamping device comprising two coupling members and a clamping mechanism is disclosed in EP 1 013 375 A2. A coupling device is described, consisting of a first coupling member and a second coupling member, as well as a clamping mechanism for the axial clamping together of the two coupling members, wherein projecting from the first coupling member are at least three prism pins, each of which is provided on at least one side with a prismatic surface, and wherein on the first coupling member there are configured at least three mutually spaced z reference surfaces, which lie in an x-y plane extending transversely to the clamping direction, and wherein, furthermore, the second coupling member has at least three grooves, which are aligned to the prism pins and on which axial-elastic elements for the accurate positioning of the coupling members relative to one another in the x-y plane are provided. In order to simplify the structural design of the z positioning of two coupling members, it is provided that the z reference surfaces are configured on the free end faces of the prism pins and a z counter reference surface is configured on the groove floor of each groove.

The problems and drawbacks associated with the current state of the art are described below.

The previous clamping devices can generally be used only for specific applications, so that a multiplicity of clamping devices are necessary to cover as wide a range of applications as possible. For the powder pressing process, for instance, high requirements are placed upon the tools and their clamping devices, in particular a high exposure to forces. It would further be advantageous if a clamping device could be used for different machining processes, for example in milling, in grinding, in EDM, or with other machine tools. Similarly, the clamping device should be usable for different tool forms (for instance, electrode forms in EDM), without time-consuming conversion times. One problem is to find a solution to clamping both the small-sized holders and the larger-sized holders to tools or workpieces on workpiece plates by means of a universally designed clamping device.

In addition, there is a requirement to provide in the coupling part designed for the clamping of a tool (drill, electrode, etc.) room to allow the tool to be firmly seated such that it can adequately withstand load. In high-speed milling cutters, specifically, this problem of the present state of the art is yet to be solved.

In addition, the drawback of undesirable lateral forces in the clamping phase often arises, caused by clamping balls or other clamping elements.

The object of the invention is thus to propose a clamping device which remedies these abovementioned drawbacks.

SUMMARY OF THE INVENTION

According to the invention, this object is achieved by the fact that the holder has an upper part and a tubular extension, the upper part being detachably connected to the tubular extension.

The feature according to which the holder is constructed in two parts from an upper part and a tubular extension lessens or eliminates the abovementioned drawbacks of the prior art.

The two-part holder according to the invention can be used in a chuck which is known per se and in a clamping device composed of two chucks.

Further drawbacks as occur in the prior art are remedied by the further inventive embodiment of two concentric chucks. Firstly, by virtue of this "double chuck", both small holders with tools and large holders with tool plates are able to be used. The inner and the outer chuck have similar or identical x-y references. The z references are disposed in the same plane or virtually in the same plane. The x-y-z coordinates of the two chucks are fully coordinated. The z coordinate of one chuck is disposed close to the z coordinate of the other chuck. The two chucks are connected coaxially to one another to form a unit. In the connected state, the two chucks are perfectly centrically adjusted. No separate adjustment is necessary. Due to this inventive device, it is possible to produce chucks of substantially smaller diameter than chucks according to the prior art, generally up to 25% smaller.

The inner chuck has in the center a continuous opening. This allows the reception of tools with long clamping pins. The previous central openings in the clamping devices served exclusively as a passage for liquids and not for the clamping of tools or workpieces.

In order to reduce or eliminate the adverse lateral forces, the middle fastening part is of tubular configuration and is advantageously provided on the outer periphery as a bayonet fastening.

The clamping device according to the invention, comprising an inner and an outer chuck and comprising a tubular extension for clamping the holder to the chuck(s) offers a high and precise accuracy under extreme load, in particular in high-speed milling cutters, in EDM or in other machine tools.

The holder can be clamped to the inner and/or outer chuck or to a single chuck.

According to a preferred embodiment, the inner chuck has in the center a continuous opening running in the axial direction.

This inner pass-through opening provides sufficient room for clamping elements of tools or workpieces.

In addition, the holder can have in the center a pass-through opening for the evacuation of chips generated in the machining.

The inner chuck as well as the outer chuck has x-y references and z references, which, in the clamping operation, cooperate with corresponding means of the holder. In addition, the means of the holder for the x-y references can advantageously be configured as elastic inner and/or outer tongue pairs.

A further advantageous embodiment of the chuck consists in the holder having as z references inner and outer contact surfaces.

According to a preferred embodiment of the chuck according to the invention, the holder has a tubular extension for clamping to the inner and/or outer chuck, the external diameter D of the tubular extension lying in the order of magnitude of the internal diameter of the continuous opening up to the external diameter of the inner chuck.

In addition, the diameter of the central opening of the tubular extension can lie in the region of or can be at least half as large as the diameter which is given by the inner margin of the inner x-y surfaces.

Similarly, the diameter of the central opening in the upper part of the holder can lie in the order of magnitude of the diameter of the tubular extension.

The x-y references of the inner chuck can be disposed at the same height—viewed in the z direction—as the surfaces of the x-y planes of the outer chuck.

The x-y references and the z references of the outer chuck lie within two imaginary circles.

The holder can be clamped in a manner which is known per se to the inner and/or outer chuck or individual chucks.

BRIEF DESCRIPTION OF THE DRAWINGS

The invention is represented below with reference to illustrative embodiments in the drawings, in which.

DETAILED DESCRIPTION

Figure 1:
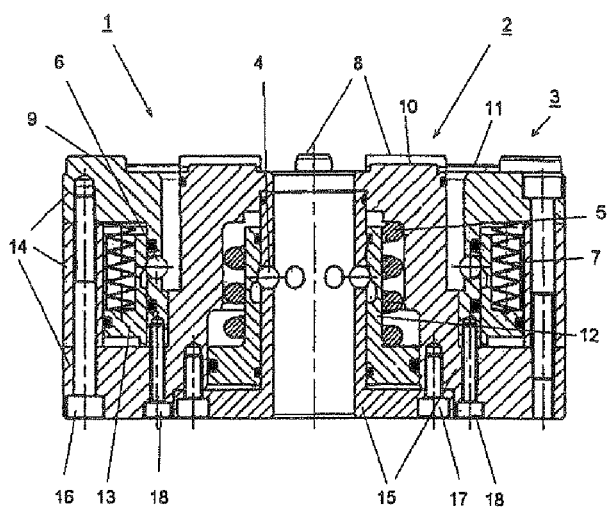
FIG. 1 shows a sectional view of a clamping device.

In FIG. 1 is shown a possible embodiment of a clamping device 1 according to the invention. The inner chuck 2 is fixedly connected by means of the screws 18 to the outer chuck 3, the inner chuck 2 being disposed concentrically to the outer chuck 3. The basic element of the inner chuck 2 consists of the parts 15, which are held together by means of the screws 17. The inner chuck 2 has clamping balls 4, which cooperate with an inner clamping plunger 12 and a clamping spring 5 in a manner which is known per se. The outer chuck 3 is correspondingly constructed. The basic element consists of the parts 14, which are held together by means of the screws 16. It likewise has clamping balls 6, an outer clamping plunger 13 and a clamping spring 7. The two clamping plungers 12, 13 can be acted upon in a known manner by means of compressed air. Both the inner and the outer chuck 2, 3 possess both inner 8 and outer 9 x-y references and inner 10 and outer 11 z references.

Figure 2:
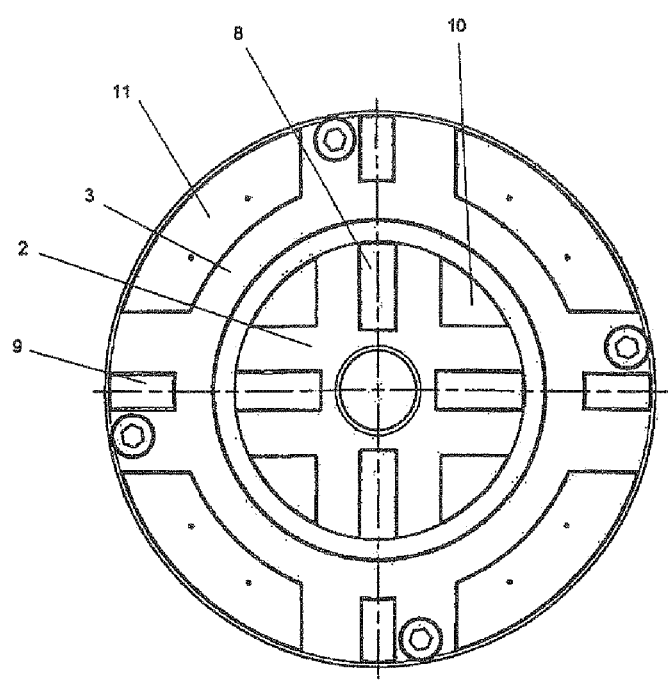
FIG. 2 shows a top view of the clamping device of FIG. 1.

The arrangement of the x-y and z references 8, 9, 10, 11 can be seen in the top view in FIG. 2. The inner x-y references 8 of the inner chuck 2 and the outer x-y references 9 are configured, for instance, as bars with conical edges, and the center lines of the inner and outer x-y references coincide with extreme accuracy. Between the inner x-y references 8, inner z references 10 are provided. Correspondingly, the outer chuck 3 has on the peripheral side between the outer x-y references 9 the z references 11, the surface of the z references 10 and 11 having the same height or being slightly offset.

Figure 3:
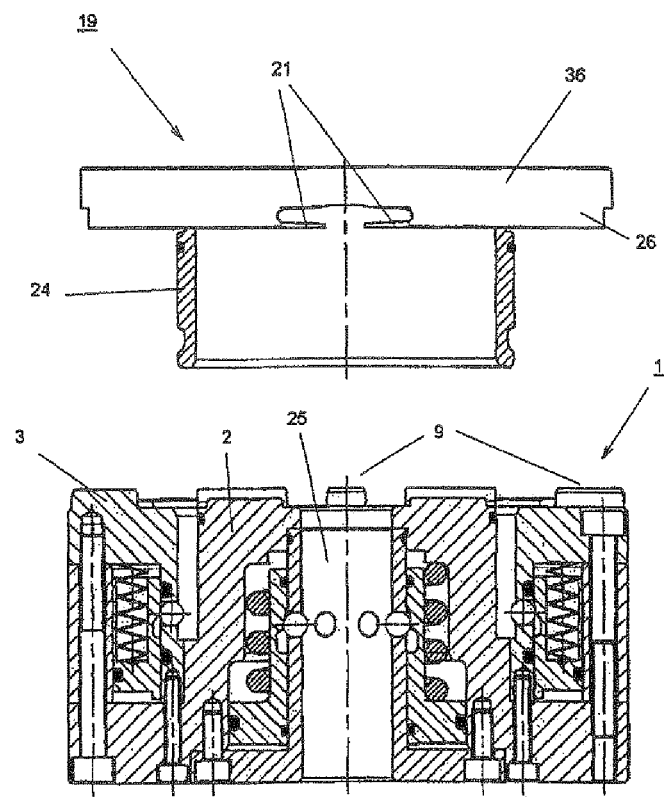
FIG. 3 shows a holder of a chuck with the clamping device 1.
Figure 4:
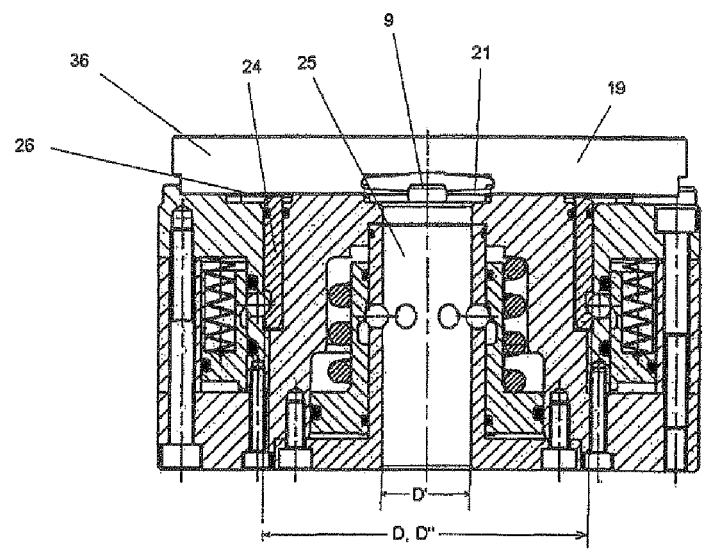
FIG. 4 shows a sectional view of the clamping device of FIG. 1, with holder clamped in place.
Figure 5:
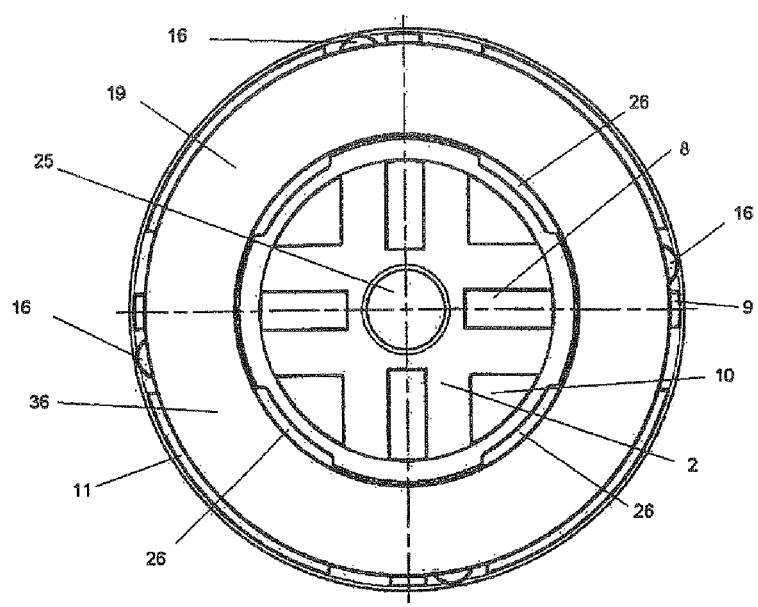
FIG. 5 shows a top view of the clamping device, with holder, of FIG. 4.

In FIG. 3, the clamping device 1 (as shown in FIGS. 1 and 2) is shown with the holder 19, which serves as an element for a plate. The holder 19 has an upper part 36 and a tubular extension 24, the upper part 36 being detachably connected to the tubular extension 24 by means of a bayonet connection 26. The holder 19 can be clamped to the clamping device 1, as is shown in FIGS. 4 and 5. In addition, in the holder 19, the outer tongue pairs 21 can be seen, which, in the clamped-together state, cooperate with the outer x-y references 9. In addition, the continuous opening 25 of the inner chuck 2 is shown. The diameter D of the tubular extension 24 lies, according to application, in the region of the diameter D' of the continuous opening 25 up to the diameter D" of the inner chuck 2, as is represented in FIG. 4.

The top view in FIG. 5 shows the bayonet device 26 of the upper part 36 with the tubular extension 19 of the holder 19. The other reference symbols correspond to the reference symbols of FIGS. 1 to 4.

Figure 6:
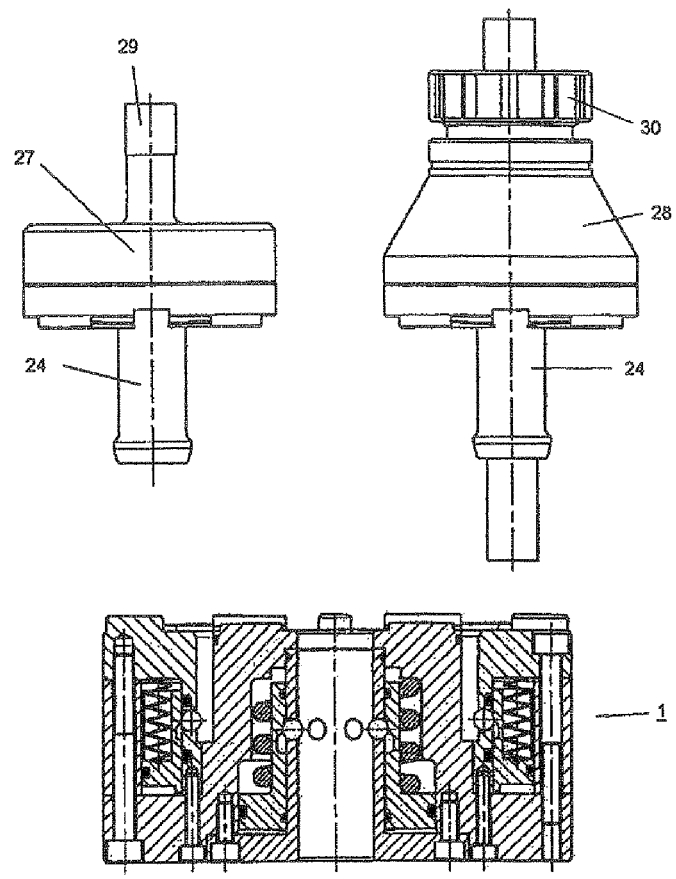
FIG. 6 shows two different applications for holders.
Figure 7:
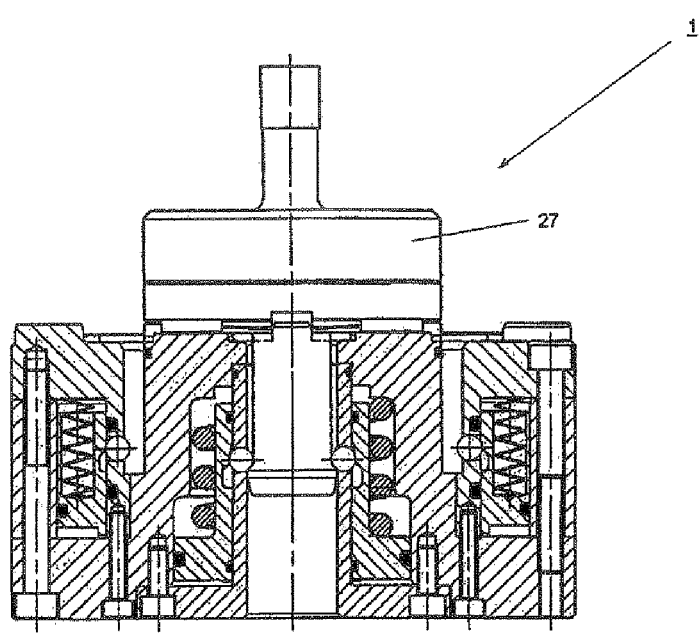
FIG. 7 shows a first embodiment according to FIG. 6 in the clamped-together state.
Figure 8:
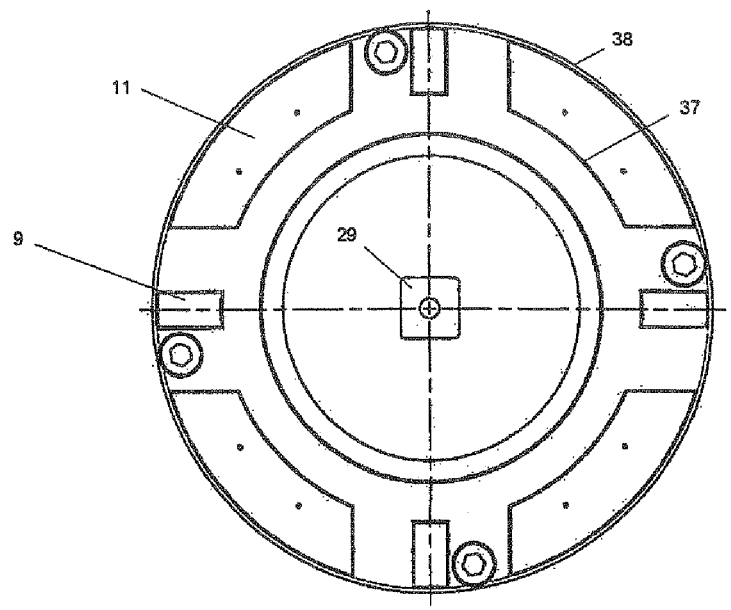
FIG. 8 shows a top view according to FIG. 7.
Figure 9:
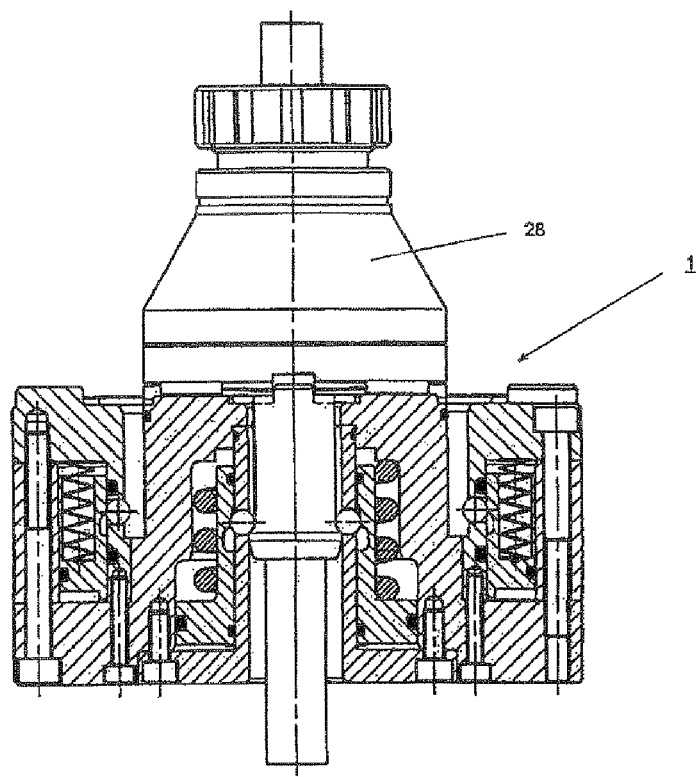
FIG. 9 shows a second embodiment according to FIG. 6 in the clamped-together state.
Figure 10:
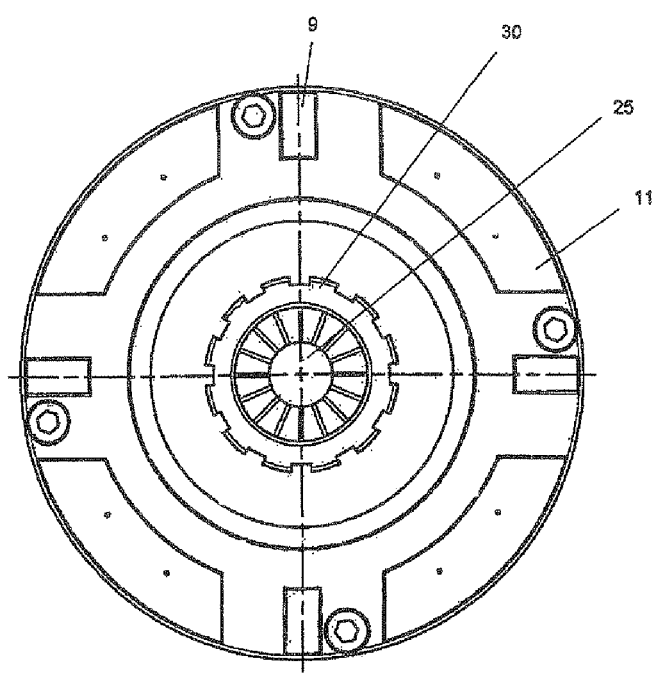
FIG. 10 shows a top view according to FIG. 9.

FIG. 6 shows two embodiments of holders 27 and 28. Both holders 27 and 28 respectively have a detachable hollow, tubular extension 24 of a diameter D, which lies in the order of magnitude of the diameter D' of the continuous opening 25 of the inner chuck 2. The holder 27 possesses a soldered or glued receiving fixture 29. The holder 28 has a special chuck 30. FIG. 7 shows the holder 27 in the clamped-together state. The top view can be seen in FIG. 8 with the x-y and z references. The x-y references 9 and the z references 11 lie between two imaginary circles 37 and 38. The other holder 28, in the clamped-together state, illustrates FIG. 9, together with the top view in FIG. 10.

Figure 11:
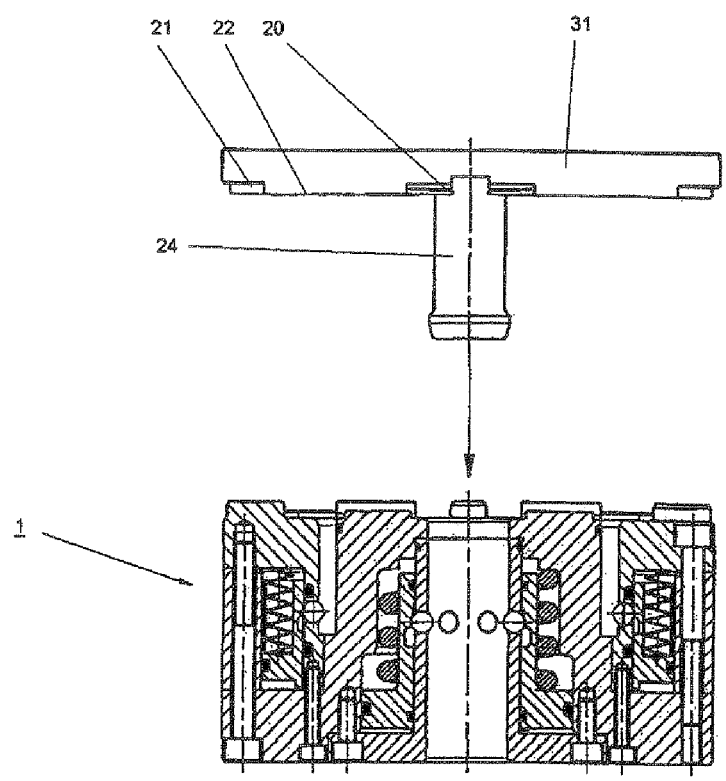
FIG. 11 shows another embodiment of a holder.
Figure 12:
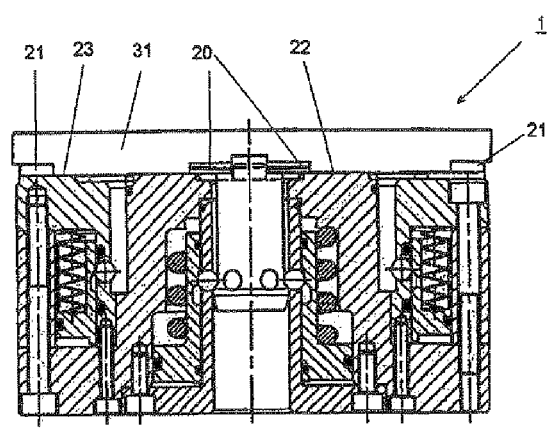
FIG. 12 shows the embodiment of FIG. 11 in the clamped-together state

In FIG. 11, the side view of a holder 31 for a plate element can be seen. In particular, the holder 31 has inner and outer tongue pairs 20, 21 and inner and outer contact surfaces 22 and 23. FIG. 12 shows the holder 31 in the clamped-in state.

Figure 13:
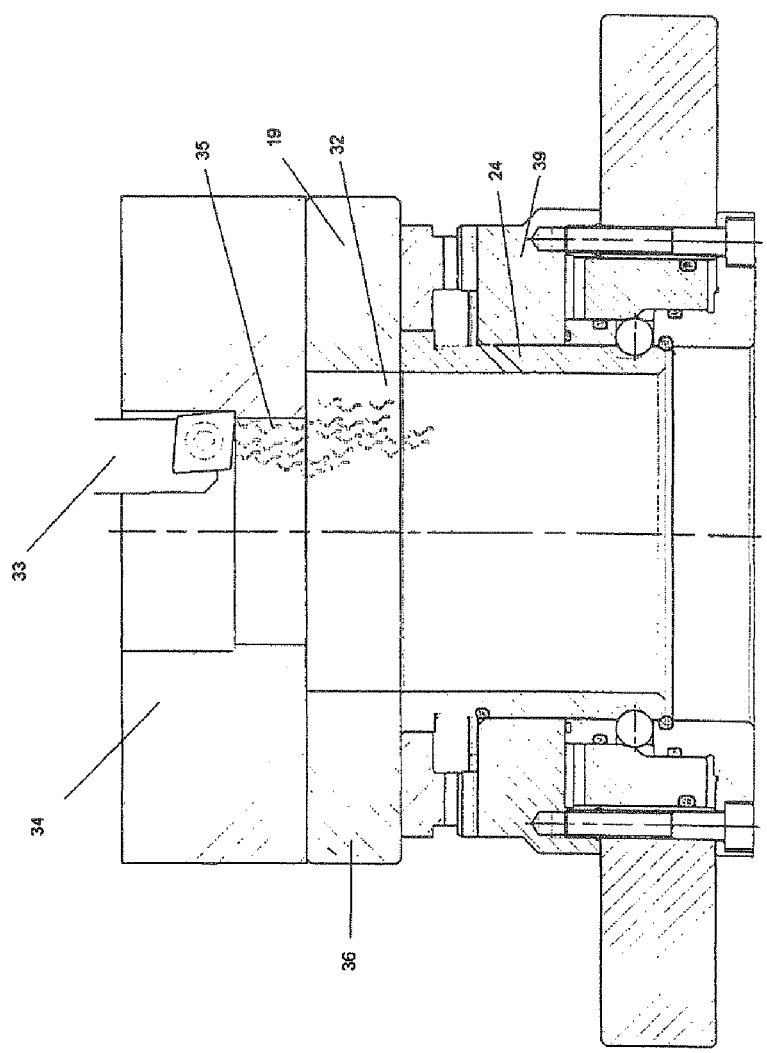
FIG. 13 shows a further embodiment of the holder 19 with chuck in the machining of a workpiece.

FIG. 13 shows an embodiment of a holder 19 clamped into a chuck 39. The workpiece 34 is machined by means of the tool 33. The holder 19 has a pass-through opening 32, the diameter of which lies in the order of magnitude of the pass-through opening of the tubular extension 24 of the holder 19. In the illustrative embodiment, the continuous opening serves for the evacuation of chips 35 generated in the machining.

The invention claimed is:

1. A clamping device for a tool or a workpiece, comprising at least one chuck and at least one holder for the workpiece or the tool, wherein the holder has an upper part and a hollow tubular extension, and the upper part is detachably connected to the hollow tubular extension such that the hollow tubular extension remains hollow when connected to the upper part, wherein the upper part defines a flat upper surface for the tool or the workpiece, wherein the chuck defines a circular opening for receiving the hollow tubular extension of the upper part, and wherein the detachable connection of the upper part of the holder to the hollow tubular extension is a bayonet connection, whereby the bayonet connection is designed to lessen or eliminate undesirable lateral forces during clamping, wherein the at least one chuck has x-y references and z references which, in clamping operation, cooperate with corresponding means of the holder.

2. The clamping device as claimed in claim 1, wherein the clamping device has an inner chuck and an outer chuck and at least one holder, the inner chuck being fixedly connected, concentrically, to the outer chuck.

3. The clamping device as claimed in claim 2, wherein the holder can be clamped to the inner chuck.

4. The clamping device as claimed in claim 2, wherein the holder can be clamped to the outer chuck.

5. The clamping device as claimed in claim 2, wherein the holder can be clamped together with the inner chuck and the outer chuck.

6. The clamping device as claimed in claim 2, wherein the inner chuck has in the center the circular opening running in the axial direction.

7. The clamping device as claimed in claim 2, wherein both the inner chuck and the outer chuck have x-y references and z references, which, in the clamping operation, cooperate with corresponding means of the holder.

8. The clamping device as claimed in claim 7, wherein the means of the holder for the x-y references are configured as elastic inner and/or outer tongue pairs.

9. The clamping device as claimed in claim 2, wherein the holder has as z references inner and/or outer contact surfaces.

10. The clamping device as claimed in claim 2, wherein the hollow tubular extension for clamping to the inner and/or outer chuck has an external diameter D lying in the order of magnitude of the internal diameter D' of the circular opening up to the external diameter D" of the inner chuck.

11. The clamping device as claimed in claim 7, wherein the x-y references of the inner chuck can be disposed at the same height—viewed in the z direction—as the surfaces of the x-y planes of the outer chuck.

12. The clamping device as claimed in claim 2, wherein the holder has in the center a continuous opening, the diameter of the opening lying in the order of magnitude of the diameter of the opening of the hollow tubular extension.

13. The clamping device as claimed in claim 1, wherein the hollow tubular extension of the holder extends into the circular opening of the chuck when the holder is mounted to the chuck.

14. The clamping device as claimed in claim 1, wherein the circular opening in the chuck is a ring-shaped opening, and wherein the hollow tubular extension of the holder extends into the ring-shaped opening when the holder is mounted to the chuck.

15. The clamping device as claimed in claim 1, wherein the means of the holder for the x-y references are configured as elastic inner and/or outer tongue pairs.

16. The clamping device as claimed in claim 1, wherein the means of the holder for the z references are inner and/or outer contact surfaces.

17. A clamping device for a tool or a workpiece, comprising at least one chuck and at least one holder, wherein the chuck has x-y references, which cooperate with a bottom face of the holder, wherein the holder has an upper part and a hollow tubular extension, the upper part being detachably connected to the hollow tubular extension, wherein the clamping device has an inner chuck and an outer chuck, the inner chuck being fixedly connected concentrically to the outer chuck, wherein the x-y references of the holder are configured as elastic inner and/or outer tongue pairs, wherein a hollow tubular extension clamps to the inner and/or outer chuck, wherein an external diameter D of the hollow tubular extension lying in the order of magnitude of an internal diameter D' of a continuous opening of the inner chuck up to an external diameter D" of the inner chuck.

18. Clamping device according to claim 17, wherein the holder is clamped to the inner chuck.

19. Clamping device according to claim 17, wherein the holder is clamped to the outer chuck.

20. Clamping device according to claim 17, wherein the holder is clamped to the inner chuck and the outer chuck.

21. Clamping device according to claim 17, wherein the continuous opening of the inner chuck runs in the axial direction.

22. Clamping device according to claim 17, wherein both the inner chuck and the outer chuck have x-y references and z references, which, in the clamping operation, cooperate with corresponding means of the holder.

23. Clamping device according to claim 17, wherein the holder has as z references inner and/or outer contact surfaces.

24. Clamping device according to claim 17, wherein the x-y references of the inner chuck are disposed at the same height—viewed in the z direction—as the surfaces of the x-y planes of the outer chuck.

25. Clamping device according to claim 17, wherein the holder has a continuous opening, the continuous opening of the holder having a diameter lying in an order of magnitude of the diameter of the opening of the hollow tubular extension.

26. A clamping device for a tool or a workpiece, comprising at least one chuck and at least one holder for the workpiece or the tool, wherein the holder has an upper part and a hollow tubular extension, the upper part being detachably connected to the hollow tubular extension, wherein the at least one chuck comprises an inner chuck and an outer chuck, the inner chuck being fixedly connected, concentrically, to the outer chuck, and wherein at least one of the inner chuck and the outer chuck have x-y references and z references which, in clamping operation, cooperate with corresponding means on the holder, and wherein the chuck defines a circular opening for receiving the hollow tubular extension of the upper part.

27. The clamping device as claimed in claim 26, wherein the circular opening is defined between the inner chuck and the outer chuck.

28. The clamping device as claimed in claim 27, wherein the circular opening is a ring-shaped opening.

* * * * *